No. 869,696. PATENTED OCT. 29, 1907.
E. A. DOTY.
NUT LOCK.
APPLICATION FILED OCT. 19, 1906.

Witnesses
Inventor
Edwin A. Doty
by Ward & Cameron
Attys.

UNITED STATES PATENT OFFICE.

EDWIN A. DOTY, OF ALBANY, NEW YORK.

NUT-LOCK.

No. 869,696.  Specification of Letters Patent.  Patented Oct. 29, 1907.

Application filed October 19, 1906. Serial No. 339,618.

*To all whom it may concern:*

Be it known that EDWIN A. DOTY, a citizen of the United States, residing at the city of Albany, in the county of Albany and State of New York, has invented certain new and useful Improvements in Nut-Locks, of which the following is a specification.

Figure 1:
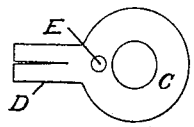
Figure 4:
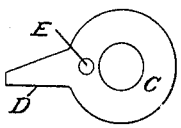
Figure 6:
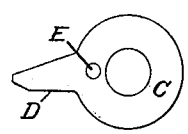
Figure 2:
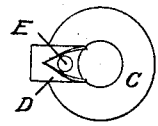
Figure 5:
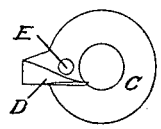
Figure 7:
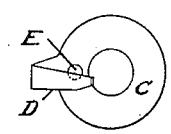
Figure 3:
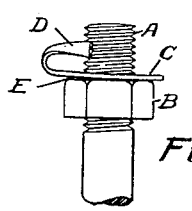
Figure 8:
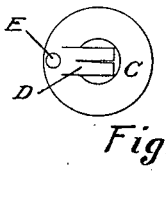
Figure 9:
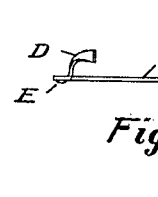
Figure 10:
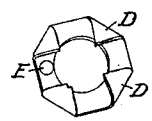

My invention relates to nut-locks, and the object of my invention is to construct a one piece nut-lock made to comply with and to engage in the thread or threads of a metal bolt and so constructed that any part of said nut-lock or extension thereof may contain one or more points or blades to impinge into or upon the surface of a metal bolt in such manner as to prevent the said nut-lock turning either forward or backward. I attain this object by means of a locking-nut constructed as shown in the accompanying drawings, in which:

Figure 1 is a top plan view of my locking-nut with its elongated arm extending out straight. Fig. 2 is a top plan view of the same with the elongated arm bent over and its end divided into two points ready for use. Fig. 3 is an elevation of a bolt with a nut locked thereon by my locking-nut. Figs. 4, 5, 6 and 7 are top plan views of my locking-nut constructed with only one point or blade. Figs. 8 and 9 are views of my locking-nut showing the blades or points cut out of the waste from the hole designed for the bolt to pass through. Fig. 10 shows modified form of my locking nut.

Similar letters refer to similar parts throughout the several views.

September 4th, 1906, Letters Patent of the United States No. 830,055 were issued to me for nut-lock. My present invention is an improvement upon the nut-lock shown and described in that patent. This improvement consists principally in making the locking-nut of one piece only, instead of two pieces, as shown in my former patent, and providing a tilting lug on the under side of the locking-nut. Thus making a more simple and cheap, as well as a more efficient device than that shown in my former patent.

A is an ordinary bolt with screw-threads thereon.

B is a nut with screw-threads adapted to mesh with the screw-threads of the bolt and designed to be locked upon the bolt so that it cannot turn or become loose.

C is a locking-nut adapted to fit upon the screw-threads of the bolt and to screw down along the bolt until it comes into close contact with the nut. The locking-nut, C, is preferably made of sheet metal and may be stamped out of the size and shape desired.

The locking-nut, C, has one or more elongated arms, extending from the sides or formed from the waste in stamping out the hole in the center of the locking-nut, designed for the bolt to pass through, as shown. The ends of these arms I make into points, more or less sharp, and bend them over, so as to come in contact with the threads of the bolt. The elongated arms may be divided so as to form two points or blades, or may be reduced to one point. The points may be twisted so as to be at an angle with the body of the arm or not, as desired. Also the points or ends of the arms may be reduced to fine points, or the points may be broadened in the form of blades, as desired. When the arms are divided into two points the points are spread apart sufficiently for the points to come into contact with the threads of the bolt on each side of the center of the bolt. When the elongated arm has only one point that point should be made to come in contact with the thread of the bolt on the side of the center of the bolt, toward which it would turn to unscrew the locking-nut. In using my locking-nut the elongated arms are bent at such an angle that when the locking-nut is screwed upon the bolt, until it comes into contact with the nut, it is designed to lock, the points may be driven down in contact with the threads of the bolt, as by sharp taps of a hammer, and become more or less indented into the screw-threads, so as to hold the nut securely in place and prevent any movement of the nut toward the end of the bolt.

I also provide, on the lower side of my locking-nut, a lug or projection, E. This projection operates to tilt the locking-nut when it comes in close contact with the surface of the nut on the bolt, so as to cause the points of the elongated arms to hold more securely to the threads of the bolt.

The use of my locking nut is obvious from the foregoing description. The holding nut is screwed to place on the bolt as far as it will go and where it is desired to be locked. My locking-nut is then screwed upon the bolt until it comes in close contact with the surface of the holding-nut. The elongated arm bent over toward the bolt and the sharpened point forced into close contact with the threads of the bolt and indented into the screw-threads more or less, depending upon the relative degrees of hardness of the points and the screw-threads, and the force used to make the contact.

My nut-lock constructed as described and shown is simple, economical and efficient.

What I claim as my invention and desire to secure by Letters Patent is:

1. A nut-lock consisting of a locking-nut adapted to be screwed on a bolt adjoining a holding-nut; a lug upon the bottom of said locking-nut adapted to come in contact with the top surface of said holding-nut and tilt said locking-nut; an elongated arm to said locking nut on the same side thereof as said lug; the end of said elongated arm forming a sharp point; said point adapted to come in contact with the screw-threads of the bolt on one side of the center thereof, substantially as described.

2. A nut-lock consisting of a locking-nut adapted to be screwed on a bolt, adjoining a holding-nut; a lug upon the bottom of said locking-nut adapted to come in contact with the top surface of said holding-nut and tilt said locking-nut; an elongated arm to said locking-nut on the same side thereof as said lug; the end of said elongated arm divided into two points; said points adapted to come in contact with the screw-threads of the bolt on each side of the center of the bolt, substantially as described.

In testimony whereof he has affixed his signature in presence of two witnesses.

EDWIN A. DOTY.

Witnesses:
    WALTER E. WARD,
    DUDLEY B. WADE.